United States Patent [19]
Belleau

[11] Patent Number: 5,975,573
[45] Date of Patent: Nov. 2, 1999

[54] STEERING SYSTEM

[75] Inventor: Ryan M. Belleau, Port Colborne, Canada

[73] Assignee: TRW Inc., Lyndhurst, Ohio

[21] Appl. No.: 09/012,200

[22] Filed: Jan. 23, 1998

[51] Int. Cl.⁶ ................................. B62D 5/22
[52] U.S. Cl. ............... 280/771; 280/93.514; 280/93.515
[58] Field of Search .............. 280/93.514, 93.515, 280/93.502, 93.51, 771, 773; 180/6.4, 417, 427, 428, 905

[56] References Cited

U.S. PATENT DOCUMENTS

| | | | |
|---|---|---|---|
| 3,765,698 | 10/1973 | Frank C. Burrell | 280/93.502 |
| 4,276,812 | 7/1981 | Dymond | 91/467 |
| 4,694,925 | 9/1987 | Roberts | 180/79.1 |
| 5,460,574 | 10/1995 | Hobaugh | 464/162 |
| 5,641,181 | 6/1997 | Ashwani K. Galhotra | 280/795 |
| 5,851,015 | 12/1998 | Edwin G. Klosterhaus | 280/93.51 |

*Primary Examiner*—Lanna Mai
*Assistant Examiner*—Cristopher Bottorff
*Attorney, Agent, or Firm*—Tarolli, Sundheim, Covell, Tumino & Szabo

[57] ABSTRACT

A vehicle includes an axle which is connected with steerable vehicle wheels and is movable relative to a body of the vehicle with the steerable vehicle wheels. A rack and pinion steering mechanism is fixedly connected with the axle and is movable with the axle relative to the body of the vehicle. A shaft assembly connects the rack and pinion steering mechanism with a vehicle steering wheel. The length of the shaft assembly can be varied to accommodate movement of the rack and pinion steering mechanism and the axle relative to the body of the vehicle.

4 Claims, 2 Drawing Sheets

STEERING SYSTEM

BACKGROUND OF THE INVENTION

The present invention relates to a new and improved vehicle steering system and more specifically to a vehicle steering system in which a rack and pinion steering mechanism is fixedly connected with an axle of the vehicle for movement therewith relative to a body of the vehicle.

Four wheel drive vehicles may have a solid axle across the front of the vehicle. During operation of the vehicle, a wheel of the vehicle may encounter a bump or depression in the road. When this occurs, the wheel of the vehicle moves relative to the body of the vehicle. An end of the axle connected with the wheel of the vehicle also moves relative to the body of the vehicle.

In the past, vehicle steering mechanisms have been mounted on the body of the vehicle so that the axle moves relative to the steering mechanism and the body of the vehicle when the wheel of the vehicle encounters a bump or depression in the road. The body mounted steering mechanism is connected with the vehicle wheels by a linkage assembly. Relative movement between components of the linkage assembly has resulted in undesirable lash or play in the linkage.

SUMMARY OF THE INVENTION

The present invention provides a new and improved vehicle having a rack and pinion steering mechanism which is fixedly connected with an axle of the vehicle. The rack and pinion steering mechanism is movable with the axle of the vehicle relative to a body of the vehicle. To accommodate movement of the rack and pinion steering mechanism with the axle relative to the body of the vehicle, a variable length shaft assembly connects the rack and pinion steering mechanism with a body mounted vehicle steering wheel.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC PREFERRED EMBODIMENT OF THE INVENTION

Figure 1:
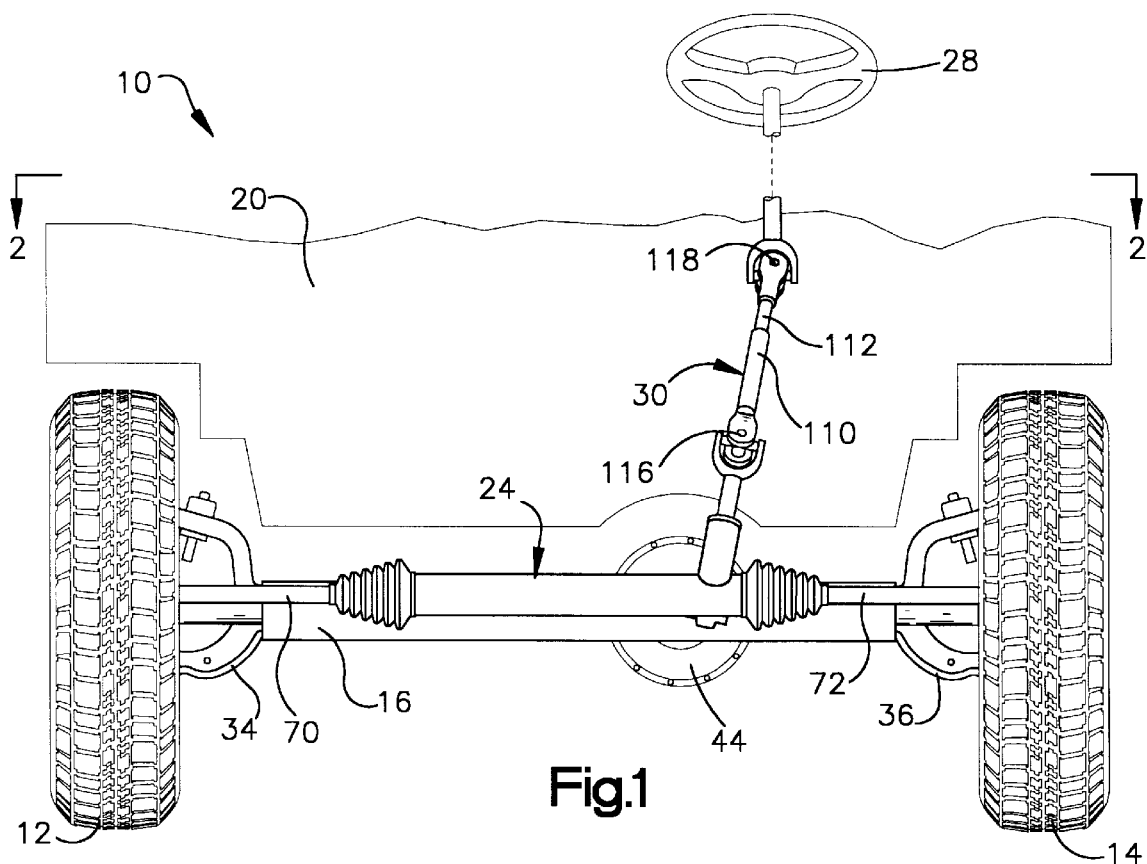
FIG. 1 is a schematic front elevational view of a vehicle having a rack and pinion steering mechanism fixedly connected to an axle of the vehicle.

A vehicle 10 (FIG. 1) has steerable vehicle wheels 12 and 14 which are interconnected by an axle 16. A body 20 is supported by the axle in a known manner. In the illustrated embodiment of the invention, the vehicle 10 is of the well known four wheel drive type in which the steerable vehicle wheels 12 and 14 are driven. When one of the steerable vehicle wheels 12 or 14 encounters a bump or depression in a road, the vehicle wheel and axle 16 moves either up or down relative to the body 20 of the vehicle. For example, if the wheel 12 encounters a bump, the wheel and one end of the axle 16 move upward. toward the body 20 of the vehicle.

In accordance with a feature of the present invention, a rack and pinion steering mechanism 24 is fixedly connected with the axle 16 of the vehicle 10. Upon rotation of a steering wheel 28, force is transmitted through a variable length shaft assembly 30 to actuate the rack and pinion steering mechanism 24. Actuation of the rack and pinion steering mechanism 24 is effective to turn the steerable vehicle wheels 12 and 14.

Figure 2:
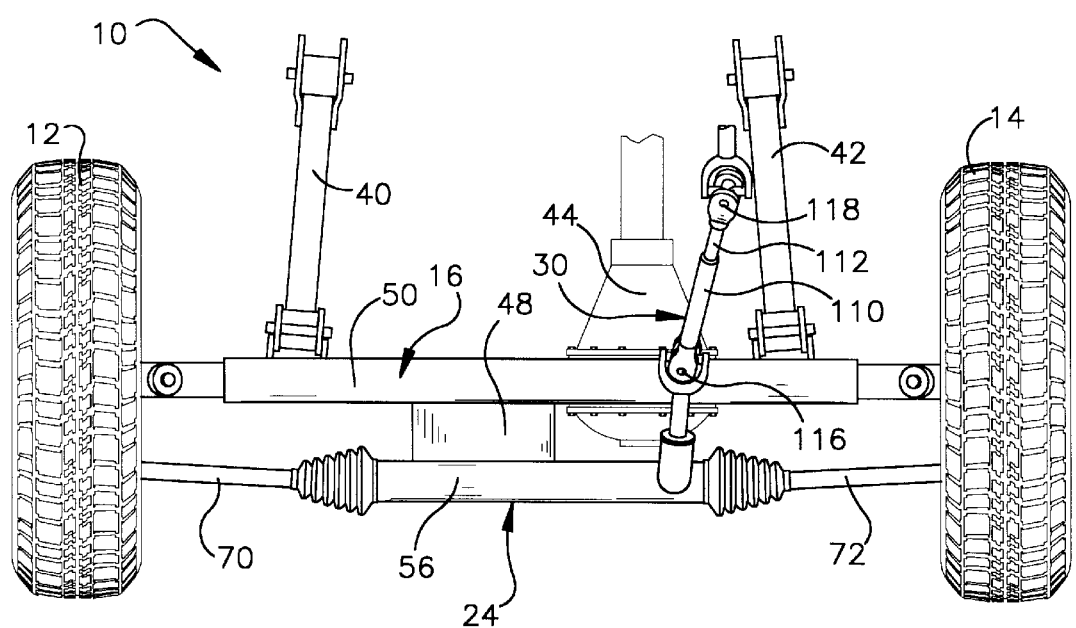
FIG. 2 is a plan view, taken generally along the line 2—2 of FIG. 1, further illustrating the relationship of the rack and pinion steering mechanism to the axle of the vehicle.

The axle 16 of the vehicle is connected with the steerable vehicle wheels 12 and 14 by axle yokes 34 and 36 (FIG. 1). Opposite end portions of the axle 16 are connected with the body 20 of the vehicle by suspension arms 40 and 42 (FIG. 2). The suspension arms 40 and 42 allow either end of the axle 16 to rise or fall, with an associated vehicle wheel 12 or 14, relative to the body 20 (FIG. 1) of the vehicle. A front wheel drive differential gear mechanism 44 is connected with the axle 16.

In order to position the rack and pinion steering mechanism 24 ahead of the differential gear mechanism 44, the axle 16 includes a support section 48 which is fixedly connected with a solid beam section 50 of the axle 16. The rack and pinion steering mechanism 24 is mounted on the support section 48 in front of the differential gear mechanism 44. This eliminates any possibility of interference between the rack and pinion steering mechanism 24 and the differential gear mechanism 44.

Figure 3:
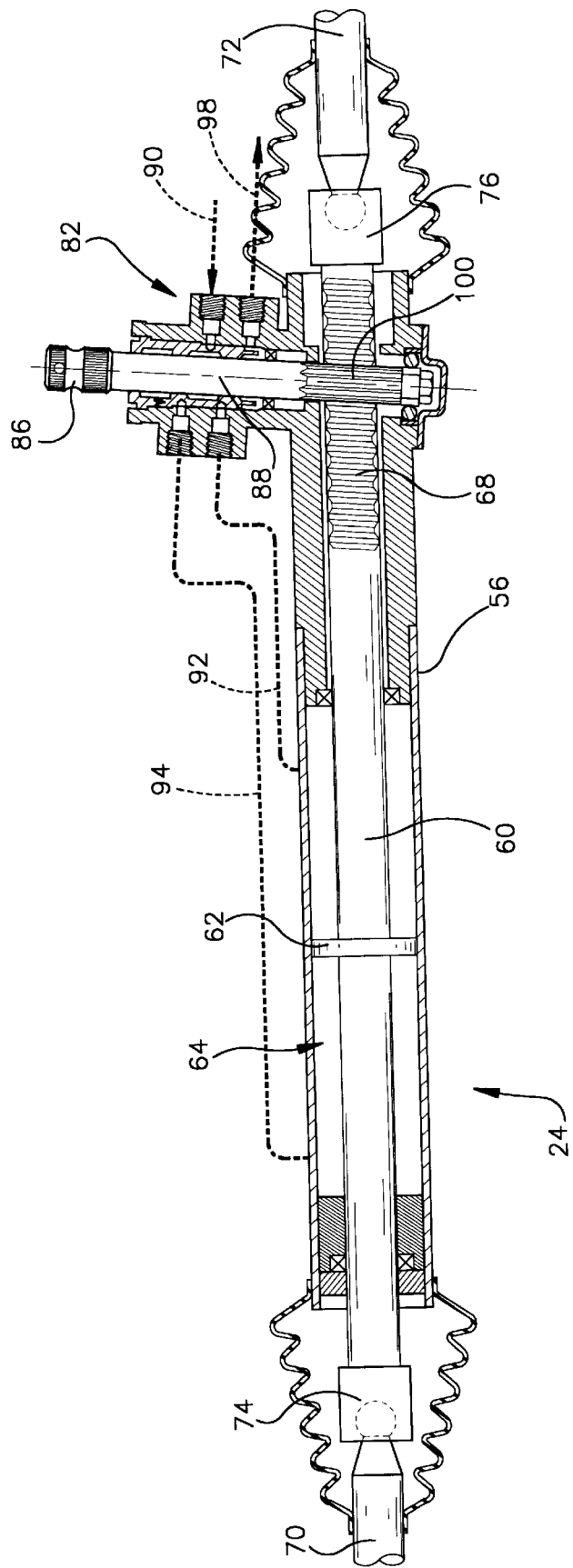
FIG. 3 is a schematic sectional view of the rack and pinion steering mechanism.

The rack and pinion steering mechanism 24 has a generally cylindrical housing 56 which is fixedly connected to the support section 48 of the axle 16. The housing 56 encloses a generally cylindrical rack bar 60 (FIG. 3). The rack bar 60 has a longitudinal central axis which is coincident with the longitudinal central axis of the housing 56 and extends parallel to the beam section 50 (FIGS. 2) of the axle 16. The parallel longitudinal central axes of the rack and pinion steering mechanism 24 and axle 16 extend transverse to a longitudinal central axis of the vehicle.

A circular piston 62 (FIG. 3) in a power steering motor 64 is fixedly connected with the rack bar. A longitudinally extending array 68 of rack gear teeth is disposed adjacent to one end of the rack bar 60. Opposite ends of the rack bar 60 are connected with tie rods 70 and 72 by ball joints 74 and 76. The tie rods 70 and 72 connect the rack bar 50 with the steerable vehicle wheels 12 and 14.

A valve assembly 82 is provided to control the operation of the power steering motor 64 in response to rotation of the steering wheel 28 (FIG. 1). The valve assembly 82 (FIG. 3) includes an input member 86 which is connected with the steering wheel 28 (FIG. 1) by the shaft assembly 30. An inner valve member 88 (FIG. 3) is formed as one piece with the input member 86.

Upon rotation of the steering wheel 28 and shaft assembly 30 (FIG. 1) the input member 86 (FIG. 3) and inner valve member 88 are rotated. In response to this rotation, the valve assembly 82 directs fluid under pressure from a conduit 90 through either a conduit 92 or 94 connected with the power steering motor 64. The other of the two conduits 92 and 94 is exhausted to a drain or fluid return conduit 98 through the valve assembly 82. The relatively high fluid pressure conducted to the power steering motor 64 results in movement of the piston 62 and the rack gear 68 to effect turning movement of vehicle wheels and rotation of a pinion gear 100.

The pinion gear 100 cooperates with the valve assembly 82 to return it to an unactuated condition when the steerable vehicle wheels have been turned to an extent corresponding to the extent of rotation of the input member 86 and steering wheel 28. It should be understood that although the rack bar 60 is primarily moved under the influence of forces supplied by the power steering motor 64, drive forces can also be transmitted directly to the rack bar 60 by the pinion gear 100. The general construction and mode of operation of the rack and pinion steering mechanism 24 is well known and is similar to that disclosed in U.S. Pat. No. 4,276,812 issued Jul. 7, 1981 and entitled "Power Steering Valve and Method of Making the Same".

During operation of the vehicle 10 (FIG.1), the axle 16 and rack and pinion steering mechanism 24 move relative to the vehicle body 20 and steering wheel 28. To accommodate this motion of the rack and pinion steering mechanism 24 relative to the steering wheel 28, the shaft assembly 30 has a variable length construction. The shaft assembly 30 includes a section 110 which is connected with the input member 86 (FIG. 3) of the valve assembly 82. A second section 112 of the shaft assembly 30 is telescopically received in the section 110 of the shaft assembly.

Upon movement of the axle 16 and rack and pinion steering mechanism 24 upward relative to the body 20, the extent of the telescopic relationship between the shaft sections 110 and 112 increases. Upon movement of the axle 16 and rack and pinion steering mechanism 24 downward relative to the body 20, the extent of the telescopic relationship between the shaft section 110 and 112 decreases.

The shaft sections 110 and 112 are splined so that rotational force (torque) can be transmitted from the steering wheel 28 to the input member 86. Universal joints 116 and 118 are provided in the shaft assembly 30 to further accommodate relative movement between the rack and pinion steering mechanism 24 and the body 20. The telescoping sections 110 and 112 of the shaft assembly 30 may have the construction disclosed in U.S. Pat. No. 5,460,574 issued Oct. 24, 1995 and entitled "Variable Length Shaft Assembly With A Lash Bushing".

The foregoing description of the present invention has been in association with a four wheel drive vehicle. However, it is contemplated that the present invention could be used in association with other types of vehicles. For example, the present invention could be used in association with a two wheel drive vehicle having a solid axle. Although a hydraulic rack and pinion steering mechanism 24 has been illustrated herein, other types of rack and pinion steering mechanisms could be utilized if desired.

From the above description of the invention, those skilled in the art will perceive improvements, changes and modifications. Such improvements, changes and modifications within the skill of the art are intended to be covered by the appended claims.

Having described the invention, the following is claimed:

1. A vehicle comprising:

a body;

steerable wheels connected with said body;

an axle connected with said steerable vehicle wheels and movable relative to said body with said steerable vehicle wheels;

a rack and pinion steering mechanism fixedly connected with said axle and movable with said axle relative to said body, said rack and pinion steering mechanism being connected with said steerable wheels and being operable to turn said steerable wheels in response to rotation of a steering wheel disposed in said body, wherein said rack and pinion steering mechanism includes a rack gear, a pinion gear disposed in meshing engagement with said rack gear, and a housing which encloses said rack and pinion gears, said housing being fixedly connected to said axle; and a shaft assembly connected with said rack and pinion steering mechanism and the steering wheel, said shaft assembly being variable in length to accommodate movement of said rack and pinion steering mechanism with said axle relative to said body of said vehicle.

2. A vehicle as set forth in claim 1 wherein said axle includes a differential gear mechanism and a support section which projects forward of said differential gear mechanism, said rack and pinion steering mechanism being mounted on said support section at a location forward of said differential gear mechanism.

3. A vehicle as set forth in claim 1 wherein said axle has a longitudinal central axis which extends transverse to said body, said rack and pinion steering mechanism having a longitudinal central axis which extends parallel to the longitudinal central axis of said axle.

4. A vehicle as set forth in claim 1 wherein said rack and pinion steering mechanism further includes a hydraulic motor connected with said rack and a steering control valve connected in fluid communication with said hydraulic motor, said steering control valve being connected with the steering wheel by said shaft assembly.

* * * * *